(12) United States Patent
Pfeilschifter et al.

(10) Patent No.: US 11,332,028 B2
(45) Date of Patent: May 17, 2022

(54) ALTERNATING VOLTAGE CHARGING DEVICE AND METHOD FOR THE SINGLE- OR MULTI-PHASE ALTERNATING CURRENT CHARGING OF A VEHICLE

(71) Applicant: Vitesco Technologies GmbH, Hannover (DE)

(72) Inventors: Franz Pfeilschifter, Munich (DE); Martin Goetzenberger, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 26 days.

(21) Appl. No.: 17/053,456

(22) PCT Filed: May 7, 2019

(86) PCT No.: PCT/EP2019/061662
§ 371 (c)(1),
(2) Date: Nov. 6, 2020

(87) PCT Pub. No.: WO2019/215136
PCT Pub. Date: Nov. 14, 2019

(65) Prior Publication Data
US 2021/0245611 A1    Aug. 12, 2021

(30) Foreign Application Priority Data
May 9, 2018   (DE) .................... 10 2018 207 317.1

(51) Int. Cl.
*B60L 53/22*   (2019.01)
*H02J 7/34*   (2006.01)

(52) U.S. Cl.
CPC .............. *B60L 53/22* (2019.02); *H02J 7/345* (2013.01); *B60L 2210/30* (2013.01)

(58) Field of Classification Search
CPC .. B60L 53/22; B60L 2210/30; B60L 2210/10; B60L 2210/40; B60L 53/14;
(Continued)

(56) References Cited

U.S. PATENT DOCUMENTS 9,796,278 B2    10/2017   Zaki
2007/0194759 A1*   8/2007   Shimizu .................. H02J 7/345
320/166
(Continued)

FOREIGN PATENT DOCUMENTS

DE         10343925 A1     4/2005
DE       102017202236 A1   6/2017
(Continued)

*Primary Examiner* — Paul Dinh
(74) *Attorney, Agent, or Firm* — Laurence A. Greenberg; Werner H. Stemer; Ralph E. Locher

(57) ABSTRACT

An alternating voltage charging device for a vehicle is equipped with a rectifier, a battery terminal, and at least one first DC link capacitor, which is provided between the rectifier and the battery terminal. The charging device includes a switch device, which connects at least one second DC link capacitor to the at least one first DC link capacitor. The switch device interconnects the DC link capacitors in parallel in a first switching state and in series in a second switching state. There is also described a method to be carried out by the charging device.

10 Claims, 1 Drawing Sheet

(58) Field of Classification Search
CPC ...... H02J 7/345; Y02T 10/70; Y02T 10/7072; Y02T 10/72; Y02T 90/14
USPC ........................................................ 320/166
See application file for complete search history.

(56) References Cited

U.S. PATENT DOCUMENTS

| | | |
|---|---|---|
| 2007/0279010 A1* | 12/2007 | Okamura ................ H02J 7/345 320/166 |
| 2013/0314038 A1 | 11/2013 | Kardolus et al. |
| 2014/0313781 A1 | 10/2014 | Perreault et al. |
| 2015/0115888 A1 | 4/2015 | Biagini |
| 2018/0215268 A1 | 8/2018 | Pfeilschifter et al. |

FOREIGN PATENT DOCUMENTS

| | | |
|---|---|---|
| EP | 2477304 A1 | 7/2012 |
| WO | 2014180539 A2 | 11/2014 |
| WO | 2017050549 A1 | 3/2017 |

* cited by examiner

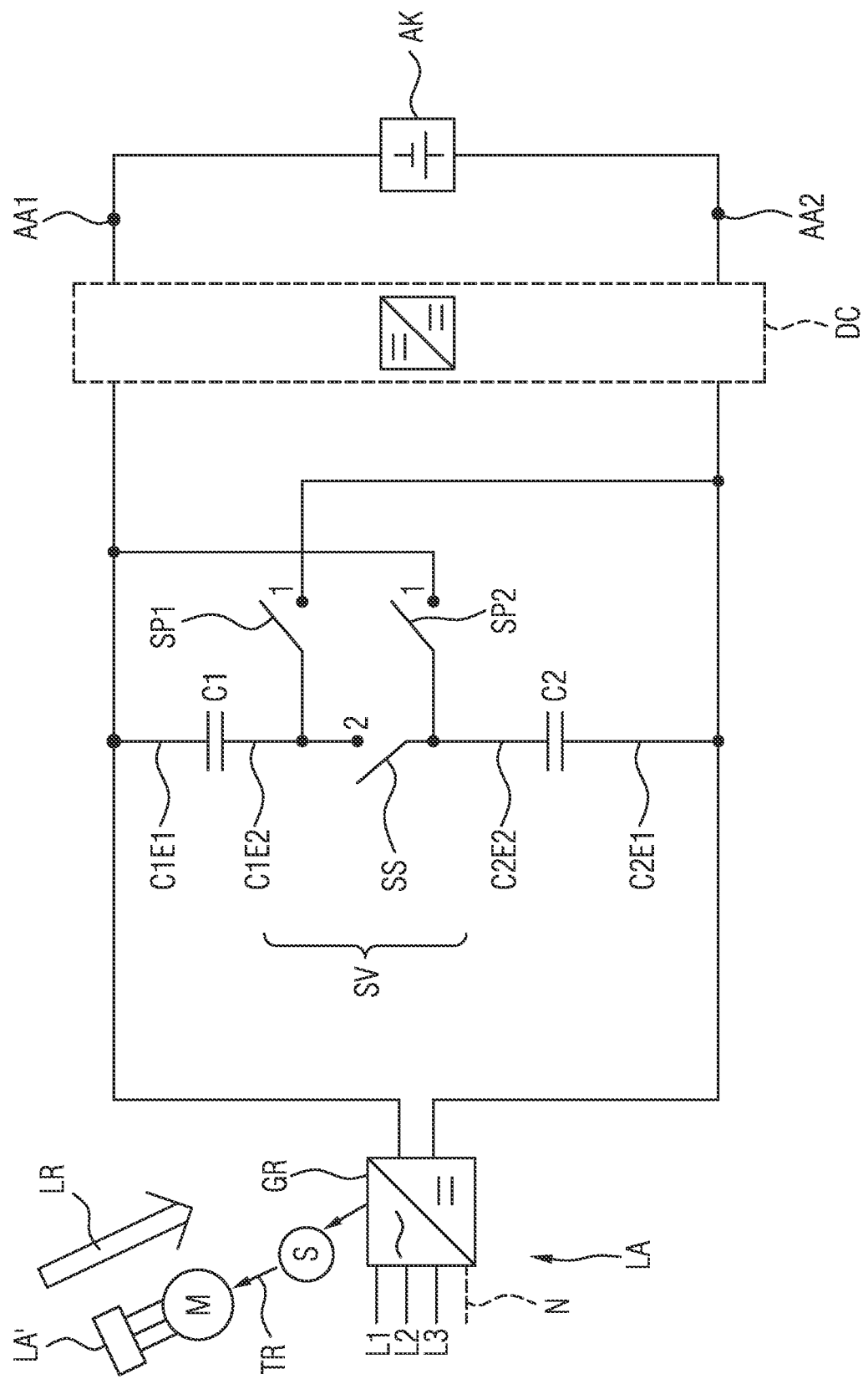

ALTERNATING VOLTAGE CHARGING DEVICE AND METHOD FOR THE SINGLE- OR MULTI-PHASE ALTERNATING CURRENT CHARGING OF A VEHICLE

BACKGROUND OF THE INVENTION

Field of the Invention

Vehicles with electrical drive comprise an accumulator to feed the drive. A charging socket is provided at many vehicles in order to transmit energy from outside into the accumulator, which is to say a charging procedure, or also to feed the energy back into a supply grid.

Charging stations, which in simple terms can be referred to as alternating voltage sources, exist for this purpose. The number of phases of this alternating voltage source differs depending on the connection to the mains grid or also according to the configuration of the mains grid. An object of the invention is to indicate a possibility by means of which different charging points, with different numbers of phases, can be used with little complexity in the vehicle.

SUMMARY OF THE INVENTION

This object is achieved by the subjects of the independent claims. Further forms of embodiment, features, properties and advantages emerge from the dependent claims, the description and the figures.

The procedure described here is based on the following considerations: Different chaining factors occur with different numbers of phases, and thereby also different peak voltages at the DC voltage side of the rectifier. The chaining factor rises with the number of phases, and with that the requirements of voltage rating of the DC link capacitor. With low phase numbers, however, higher alternating voltage components that require smoothing are found at the DC voltage side of the rectifier than is the case with higher numbers of phases, with reference in each case to the DC voltage component. With only a single phase, the voltage ripple of the pulsing DC voltage that is found during rectification extends over the full amplitude, whereas a markedly lower voltage ripple arises in a three-phase system as a result of the overlapping of the phases.

It has been noted that an alternating voltage charging system for single- and multi-phase charging comprises a DC link capacitor which in either setting is overdimensioned in one respect: in the case of single-phase charging, only a comparatively small voltage (corresponding to the lower chaining factor) requiring smoothing occurs (in comparison with multi-phase charging), while the capacitor must nevertheless have a rated voltage that is appropriate for the multi-phase charging, since one and the same capacitor is usually used in the intermediate circuit. In the case of multi-phase charging, only a comparatively low voltage ripple occurs, while the capacitor must nevertheless have a capacitance that is appropriate for the single-phase charging with increased voltage ripple if, as is usual, one and the same DC link capacitor is used.

It is therefore proposed that multiple DC link capacitors are used with an alternating current charging device that is provided for single- and multi-phase charging, wherein said capacitors are connected in parallel for single-phase charging in order in that way to achieve a high capacitance (wherein the low voltage rating is less critical in the case of single-phase charging, and can be accepted). The DC link capacitors are connected in series for multi-phase charging, in order in that way to achieve a high voltage rating, since the voltage to be smoothed is distributed in the series circuit over the DC link capacitors (wherein the low capacitance of the series circuit is less critical with multi-phase charging, and can be accepted). The DC link capacitors are thus utilized optimally in each of the said charging types; there is no overdimensioning in terms of capacitance or of voltage rating.

An alternating voltage charging device for a vehicle (in particular a vehicle that is chargeable from the outside, i.e. a plug-in vehicle) is therefore described. The alternating voltage charging device is preferably a vehicle-side alternating voltage charging device. The charging device comprises: a rectifier, an accumulator terminal and at least two DC link capacitors. A component that is configured to exercise the function as a rectifier is described as the rectifier. This can be the only function of the component, but can also be one of a plurality of functions. If, for example, the rectifier is bidirectional, then it is configured for the functions of rectifying and inverting. The accumulator terminal serves to connect an accumulator, preferably a high-voltage accumulator. A vehicle electrical system with a charging device as described here can be provided which furthermore comprises an accumulator that is connected to the accumulator terminal. The accumulator terminal usually comprises (at least) two contacts, in particular a positive contact and a negative contact. The DC link capacitors can each be formed of one capacitor element, but are preferably designed as a plurality of capacitor elements connected in parallel that may be mounted on a carrier and connected together. Each of the DC link capacitors can, in other words, be realized as a capacitor bank.

The charging device thus comprises a first DC link capacitor. This is configured to smooth the pulsating DC voltage that arises at the rectifier. This first DC link capacitor is provided between the rectifier and the accumulator terminal, in particular connected in parallel, perhaps to a busbar between the rectifier and the accumulator terminal.

A switch device is provided to select whether the DC link capacitors are connected in parallel or in series. The charging device comprises such a switch device. The switch device connects the at least one second DC link capacitor to the at least one first DC link capacitor, in particular connected selectively in parallel or in series. The switch device is configured to connect the DC link capacitors (i.e. the at least one first and the at least one second DC link capacitor) in parallel in a first switch state. The switch device is configured to connect the DC link capacitors to one another in series in a second switch state. The switch device can be realized by means of electromechanical switches or by means of semiconductor switches such as transistors, for example MOSFETs or IGBTs.

A series switch can be connected in series between the capacitors which, when it is closed (i.e. in the second switch state), connects the capacitors in series. The capacitors each comprise a first and a second electrode. The first electrode of the first capacitor can be connected permanently to a first potential of the DC voltage side of the rectifier, for example with the positive potential. The first electrode of the second capacitor can be connected permanently to a second potential of the DC voltage side of the rectifier, for example with the negative potential. The series switch connects the second electrodes (i.e. the inner electrodes) to one another (in a switchable manner).

A first parallel switch switchably connects—and preferably in the first switch state—the second electrode of the first capacitor to the second potential, in particular the negative potential. A second parallel switch switchably connects—and preferably in the first switch state—the second electrode of the second capacitor to the first potential, for example a supply potential. The series switch on the one hand and the parallel switches on the other hand are closed in alternation (and in particular also opened in alternation). A controller that is connected in a controlling manner to the switches can be provided, and is configured to close and to open the switches in alternation in the illustrated manner. Only when the series switch is driven open (i.e. in the first switch state) are the parallel switches in the closed state, corresponding to the first switch state. Only when the parallel switches are driven open (i.e. in the second switch state) is the series switch in the closed state, corresponding to the second switch state. The controller is configured to drive the switches accordingly.

The second potential can be a reference potential, for example ground, or can correspond to the negative potential of the device. The first potential can be a supply potential, for example the positive potential of the device.

The charging device and, in particular, the rectifier, is designed for single-phase charging ("single-phase mode", corresponding to the first switch state) and for multi-phase charging ("multi-phase mode", corresponding to the second switch state). It is preferably provided that the modes are only active in alternation, not simultaneously. The switch device is configured to adopt the first switch state during a single-phase charging process (corresponding to a parallel connection of the capacitors), and to adopt the second switch state during a multi-phase charging process (corresponding to a series connection of the capacitors).

The rectifier preferably comprises an alternating voltage side. This is connected to a plurality of phase terminals. The phase terminals are, for example, configured for single-phase charging and multi-phase charging. The alternating voltage side is alternatively connected to a multi-phase terminal as well as to a single-phase terminal. The terminals are then arranged in parallel with one another from the electrical point of view.

The rectifier can be a passive rectifier. The rectifier can, furthermore, be an active rectifier. The rectifier can in addition be a bidirectional rectifier. Finally, the rectifier can be an inverter that is configured, in a rectifier mode, to rectify selectively in a single- or multi-phase manner, and, in an inverter mode, to convert DC voltage into single- or multi-phase alternating voltage in the opposite direction. Components that are configured to exercise the function of rectification are thus referred to as rectifiers. This can, however, be one of a plurality of functions. As an active rectifier, this comprises switches that can be controlled from outside, such as semiconductor switches such as transistors, for example MOSFETs or IGBTs. This is also true for the configuration as an inverter. As a passive rectifier, this comprises diodes as switches.

In one form of embodiment the rectifier is designed as an inverter. The inverter is connected to an electric machine (as part of the device), or comprises machine phase terminals for connection to an electric machine. It can be provided that the electric machine connects the inverter to the charging terminal. The charging current path also passes here through the windings of the electric machine (or at least one of them), in order to enable a filtering effect or voltage conversion (in addition to the rectification).

In a further form of embodiment the rectifier is also designed as an inverter. This is connected selectively through a selection switch either to the charging terminal or to an electric machine, or to machine phase terminals for connection to an electric machine. The charging current path does not in this case pass through the electric machine.

It can be provided that at least a first and/or the at least one second DC link capacitor is designed as a plurality of capacitor elements connected in parallel. The installation space can thereby be more flexibly designed. At least one supplementary smoothing capacitor connected to the DC side of the rectifier in parallel (and in particular not switchable or configurable) can be provided.

The DC voltage converter, or its DC voltage side, can be connected directly (i.e. without any voltage-converting elements) to the accumulator terminal. A DC voltage converter can alternatively be provided between the DC link capacitors and the accumulator terminal.

Instead of a rectifier, a DC voltage converter, or another component with a DC voltage side, can be provided, which is connected, as described here, to the DC link capacitors, for example a DC voltage converter, that has a side at which, when operating, a pulsating (for example a chopped and/or pulse-width modulated) DC voltage appears that is smoothed by means of the DC link capacitors. The device can be provided for general tasks, and is not limited to a charging device; in particular, the device can be a converter or a current converter. The device described here is preferably associated with a vehicle, or employed in a vehicle electrical system, but can also be provided in a stationary device, for example in a charging station or in a (mobile) charging unit external to the vehicle. Finally, a vehicle electrical system (or a charging station) can be provided that is fitted with a device as described here.

In addition, a method for the single- or multi-phase alternating current charging of a vehicle is also described. The purpose of the method is to rectify an alternating charging voltage. The rectified charging voltage is smoothed or supported by means of a first and a second DC link capacitor. If a multi-phase alternating charging voltage is rectified, the rectified charging voltage is smoothed by means of a series interconnection of the DC link capacitors. If a single-phase alternating charging voltage is rectified, the rectified charging voltage is to be smoothed by means of a parallel interconnection of the DC link capacitors (i.e. the same DC link capacitors). The identical DC link capacitors are used in both cases, although in different configurations (i.e. connected in parallel or in series).

Preferably a determination as to whether a single-phase alternating charging voltage or multi-phase alternating charging voltage is present at a charging terminal is made before the smoothing. If a multi-phase alternating charging voltage is present, the DC link capacitors are connected in series (corresponding to the second switch setting). If a single-phase alternating charging voltage is present, the DC link capacitors are connected in parallel (corresponding to the first switch setting). The smoothing is preferably performed by means of the DC link capacitors after the DC link capacitors have been connected. The connection can also be referred to as configuration. The connection is preferably carried out by means of the switch device.

The determination can be provided by a controller that is in particular connected in a controlling manner to the said switches of the device. A higher-level control unit can, furthermore, perform the determination and transmit a relevant configuration signal to the controller that is connected in a controlling manner with the switch device. An occupancy sensor, a voltage sensor, a frequency ascertainment unit or a signal input interface (preferably wireless) that are connected to an input of the controller or of the higher-level control unit can be provided. If the occupancy sensor or the voltage sensor only ascertains one or two occupied contacts carrying a potential at the alternating voltage side of the rectifier, at the phase terminals (including a neutral line) or (an occupancy) at the single-phase terminal, then single-phase charging is to be assumed, corresponding to the first switch state. If the occupancy sensor or the voltage sensor ascertains more occupied contacts carrying a potential at the alternating voltage side of the rectifier (corresponding to phases of a three-phase grid), at the phase terminals or (an occupancy) at the multi-phase terminal, then multi-phase charging is to be assumed, corresponding to the second switch state. If the frequency ascertainment unit ascertains a frequency of 60 Hz, corresponding to the frequency in a US supply grid, then single-phase charging is to be assumed. If the frequency ascertainment unit ascertains a frequency of 50 Hz and a multi-phase occupancy, then multi-phase charging is to be assumed. In the same way, the signal input interface can be configured to receive a signal that explicitly or inherently identifies the charging type (i.e. single-phase or multi-phase), so that the switch setting is chosen depending on this charging type.

The charging device is configured to carry out the method.

BRIEF DESCRIPTION OF THE DRAWING

The FIGURE shows, by way of example, one possibility for embodying the charging device described here, and serves to explain the method referred to here.

DETAILED DESCRIPTION OF THE INVENTION

The charging device illustrated in the FIGURE comprises a rectifier GR whose DC voltage side is connected to an accumulator terminal AA1, AA2 of the charging device. AA1 here forms the positive potential rail and AA2 the negative potential rail. In other words, AA1 and AA2 form the positive pole terminal and the negative pole terminal for the accumulator AK. A first capacitor C1 and a second capacitor C2 (for example representing respective capacitor banks) are illustrated between the rectifier GR on the one side and the accumulator terminal AA1, AA2 on the other side. The first capacitor C1 and the second capacitor C2 are coupled to one another via a switch device SV.

A series switch SS (of the switch device SV) connects the capacitors C1 and C2. The capacitors C1, C2 are also connected to the DC voltage side of the rectifier GR. The first capacitor C1 here comprises a first electrode C1E1, which is connected to the positive supply potential (i.e. to the terminal AA1). The first capacitor comprises a second electrode C1E2. The latter electrode is connected to the series switch SS. In a converse manner, the capacitor C2 comprises a first electrode C2E1 that is connected to the negative supply potential, and a second electrode C2E2 that is also connected to the switch SS. The second electrodes of the capacitors C1 and C2 are connected to one another via the series switch SS. If the series switch SS is closed, corresponding to a switch setting 2, then the capacitors C1 and C2 are connected to one another in series. A higher voltage rating (compared to the parallel connection) results, although with a low capacitance (which, however, plays less of a role in multi-phase charging).

A first parallel switch SP1 and a second parallel switch SP2 are furthermore present. The first parallel switch SP1 connects the second electrode C1E2 of the first capacitor C1 to the negative supply potential. In other words, the switch SP1 connects the electrode of the first capacitor that faces towards the second capacitor C2 to the negative supply potential in a switchable manner. In a converse manner, there is a second parallel switch SP2 that connects the second electrode C2E2 of the second capacitor C2 to the positive supply potential in a switchable manner. Here again, the second parallel switch SP2 connects the electrode of the second capacitor that faces towards the first capacitor C1 to the positive supply potential. The places at which the parallel switches SP1, SP2 are connected to the capacitors C1, C2 are connected to one another via the series switch SS in a switchable manner. In switch position 1 ("first switch position") the parallel switches SP1 are connected (and the series switch SS opened), wherein the capacitors C1, C2 are thereby connected to one another in parallel. A higher capacitance results, at the cost of a voltage rating, which is nevertheless of less importance during single-phase charging.

These properties are complementary to the properties that result in the switch position 2 ("second switch position").

An optional DC voltage converter DC is positioned between the capacitors C1 and C2, which can also be referred to as DC link capacitors, and the accumulator terminals AA1, AA2. This is not provided in one embodiment, and the supply potentials of the rectifier GR are connected directly to the accumulator terminals A1. An accumulator AK is connected to the accumulator terminals A1.

The rectifier GR further comprises a charging terminal LA that comprises a plurality of phases L1 to L3, and in some cases also a neutral line N. If only L1 (and N) are occupied, then charging is single-phase, and the capacitors are connected to one another in parallel by the switch device SV. If, in addition to phase L1, a further phase L2 or L3 is used, or if all phases L1 to L3 are used or if these are occupied, then the capacitors C1, C2 are connected in series, wherein the switch device SV here brings about the series connection through the series switch SS.

A selection switch S can be provided at the alternating current side, by way of which an electric machine M can be connected. In the form of embodiment illustrated, the inner phase terminals are connected to an optional charging terminal LA'. Charging current can thereby be passed through the electric machine when charging. The inner phase terminals (or their lead-outs) and the charging terminal LA' are, however, only optional, and can be omitted. In this case, the selection switch S only connects the alternating current side of the rectifier GR to the electric machine when power is exchanged between the electric machine and the rest of the vehicle electrical system, for example when traction is provided. The case of providing traction is illustrated through the power flow arrow TR (and the arrow pointing at the selection switch S).

If, however, the optional charging terminal LA' is provided, a charging path LR can result, with which power is output via the optional charging terminal LA', through the motor (in particular by way of its inner phase terminals) to the alternating current side of the rectifier GR, and passed on by the rectifier GR to the capacitors C1, C2. The optional charging terminal LA' can here again have single-phase or multi-phase occupancy. The corresponding switch settings for the switch device SV result.

In principle the feed can also take place in reverse, so that the rectifier (as an active rectifier) transmits power to the charging terminals LA or LA', in order to feed power back from the accumulator AK into a connected supply grid or a connected stationary store.

If the rectifier GR is designed as an inverter, and can thus execute the function of the inverter or the corresponding inverting in addition to rectifying, then the alternating current side of the inverter or of the rectifier GR is connected to the electric machine M. The inverter can be designed here to provide that, during a traction mode, current that is configured to bring about a rotating field in the electric machine is output from the inverter to the electric machine M. In this case the capacitors C1 and C2 can be connected in series or in parallel (wherein this depends on the accumulator voltage AK), in order to support the DC voltage supply for the inverter (designed as the rectifier GR) when providing traction. When providing traction, the switches of the switch device SV can, alternatively, be open.

If the rectifier GR is designed as an inverter, it can be configured as a BnC bridge, wherein n corresponds to twice the number of the phases, for example as a B6C bridge. A controller can be provided, for example the controller referred to above, to drive the switches of the inverter in order to generate a three-phase current for the electric machine in a traction mode and to operate as a (controlled) rectifier in a charging mode.

The invention claimed is:

1. An alternating voltage charging device for a vehicle, the charging device comprising:
   a rectifier;
   an accumulator terminal; and
   at least one first DC link capacitor connected between said rectifier and said accumulator terminal;
   at least one second DC link capacitor;
   a switch device for connecting said at least one second DC link capacitor to said at least one first DC link capacitor;
   said switch device being configured to connect said first and second DC link capacitors in parallel in a first switch state, and to connect said first and second DC link capacitors in series in a second switch state.

2. The alternating voltage charging device according to claim 1, wherein said rectifier is configured for single-phase charging and multi-phase charging, and said switch device is configured to adopt the first switch state during a single-phase charging process and to adopt the second switch state during a multi-phase charging process.

3. The alternating voltage charging device according to claim 1, wherein said rectifier has an alternating voltage side connected to a plurality of phase terminals that are configured for single-phase and multi-phase charging, or said rectifier is connected to a multi-phase terminal and to a single-phase terminal.

4. The alternating voltage charging device according to claim 1, wherein said rectifier is a device selected from the group consisting of a passive rectifier, an active rectifier, a bidirectional rectifier, and an inverter, and said rectifier is configured, in a rectifier mode, to rectify selectively in a single-phase or multi-phase manner, and, in an inverter mode, to convert DC voltage into single-phase or multi-phase alternating voltage in an opposite direction.

5. The alternating voltage charging device according to claim 4, wherein said rectifier is an inverter that is connected to an electric machine, and the electric machine connects said inverter to a charging terminal.

6. The alternating voltage charging device according to claim 4, wherein said rectifier is an inverter that is selectively connected via a selection switch to an electric machine or to a charging terminal.

7. The alternating voltage charging device according to claim 2, wherein said at least one first DC link capacitor and/or said at least one second DC link capacitor is formed of a plurality of parallel-connected capacitor elements.

8. The alternating voltage charging device according to claim 2, further comprising a DC voltage converter connected between said first and second DC link capacitors and said accumulator terminal.

9. A method for single-phase or multi-phase alternating current charging of a vehicle, the method comprising:
   rectifying an alternating charging voltage to form a rectified charging voltage;
   smoothing the rectified charging voltage with a first DC link capacitor and a second DC link capacitor;
   i) if the alternating charging voltage is a multi-phase alternating charging voltage, connecting the first and second DC link capacitors in series for smoothing the rectified charging voltage by way of a series interconnection of the DC link capacitors, and
   ii) if the alternating charging voltage is a single-phase alternating charging voltage, connecting the first and second DC link capacitors in parallel for smoothing the rectified charging voltage by way of a parallel interconnection of the DC link capacitors.

10. The method according to claim 9, which comprises:
    prior to smoothing, determining whether a single-phase alternating charging voltage is present at a charging terminal or whether a multi-phase alternating charging voltage is present, and
    if a multi-phase alternating charging voltage is present, connecting the DC link capacitors in series;
    if a single-phase alternating charging voltage is present, connecting the DC link capacitors in parallel; and
    performing the smoothing step with the DC link capacitors after the DC link capacitors have been connected.

* * * * *